US006879761B2

(12) United States Patent
Rogers (10) Patent No.: US 6,879,761 B2
(45) Date of Patent: Apr. 12, 2005

(54) MULTI AXIS RIBBON (75) Inventor: Gary R. Rogers, Clemmons, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/897,386

(22) Filed: Jul. 3, 2001

(65) Prior Publication Data

US 2003/0007757 A1 Jan. 9, 2003

(51) Int. Cl.⁷ .................................................. G02B 6/44
(52) U.S. Cl. ..................................................... 385/114
(58) Field of Search ................................ 385/100, 114, 385/115, 116

(56) References Cited

U.S. PATENT DOCUMENTS

| | | | |
|---|---|---|---|
| 4,038,489 A | | 7/1977 | Stenson et al. |
| 4,188,088 A | | 2/1980 | Andersen et al. |
| 4,695,128 A | | 9/1987 | Zimmerman et al. |
| 4,984,859 A | | 1/1991 | Fujigaki et al. |
| 5,202,945 A | | 4/1993 | Foertsch |
| 5,218,659 A | * | 6/1993 | Schneider ............... 385/110 |
| 5,250,045 A | | 10/1993 | Bohley |
| 5,519,801 A | * | 5/1996 | Le Noane et al. ......... 385/115 |
| 5,542,019 A | * | 7/1996 | Pascher .................. 385/103 |
| 5,714,388 A | | 2/1998 | Kusnetz |
| 5,715,344 A | * | 2/1998 | Seo et al. ............... 385/100 |
| 5,809,195 A | * | 9/1998 | Brown et al. ............ 385/114 |
| 5,862,285 A | * | 1/1999 | Danielian et al. ......... 385/116 |
| 5,970,196 A | * | 10/1999 | Greveling et al. ......... 385/114 |
| 6,041,154 A | * | 3/2000 | Ono et al. ............... 385/115 |
| 6,141,472 A | * | 10/2000 | Ishikawa et al. .......... 385/104 |
| 6,160,940 A | * | 12/2000 | Summers et al. .......... 385/110 |
| 6,290,912 B1 | * | 9/2001 | Doms ................... 422/82.05 |
| 6,321,013 B1 | * | 11/2001 | Hardwick et al. ......... 385/114 |
| 6,381,390 B1 | * | 4/2002 | Hutton et al. ............ 385/114 |
| 6,421,487 B1 | * | 7/2002 | Hutton et al. ............ 385/114 |
| 6,493,492 B1 | * | 12/2002 | Fischer ................. 385/115 |
| 6,501,890 B1 | * | 12/2002 | Wilson et al. ............ 385/114 |

* cited by examiner

Primary Examiner—Thanh-Tam Le
(74) Attorney, Agent, or Firm—Sughrue Mion, PLLC (57) ABSTRACT The present invention is a multi axis fiber optic ribbon, which has a central portion and plurality of wings or extensions extending from the central portion in different directions. Each of the wings or extensions contain optical fibers, and can be removed from the central portion to allow splicing of the fibers in that extension without requiring removal of matrix material around the remaining extensions. Further, the central portion and the extensions are made from commonly known and used fiber ribbon matrix material, and the multi axis ribbon is manufactured in the same way, or similar manner, as current fiber optic ribbons. The present invention also has identifiers for each of the wings or extensions to allow easy identification of the wings or extensions during maintenance, installation, or splicing.

32 Claims, 10 Drawing Sheets

MULTI AXIS RIBBON

BACKGROUND OF THE INVENTION

1. Field of the Invention

The present invention generally relates to the field of optical fibers, in particular to multi axis fiber optic ribbons which are configured in the shape of a cross, turbine, or pinwheel.

2. Discussion of Related Art

Optical fibers are very small diameter glass strands which are capable of transmitting an optical signal over great distances, at high speeds, and with relatively low signal loss as compared to standard wire or cable (including wire cable) networks. The use of optical fibers in today's technology has developed into many widespread areas, such as: medicine, aviation, communications, etc. Most applications of optical fibers require the individual fibers to be placed into groupings, such as in fiber optic cables.

There are many ways to manufacture and configure fiber optic cables. One of the most common forms is the use of fiber optic ribbons. A fiber optic ribbon is created when several individually insulated fibers are aligned side-by-side and then covered with a protective coating. This results in a flat fiber optic ribbon bundle (as opposed to a circular or round fiber optic tube bundle or loose wrapped bundle) which has the optical fibers held in positions parallel to each other in the same plane.

However, even though the use of the fiber optic ribbon is one of the most common ways optical fibers are employed in cables, its use is not without its problems. For example, when a cable or buffer tube requires a large number of individual fibers, the use of a ribbon structure is not very efficient. This is primarily because the ribbons are flat, while the tubes are round, thus leaving wasted space between the center of the ribbons and the inner edges of the buffer tube or cable. This can be seen in FIG. 7, which shows a typical fiber optic cable assembly 50 as known in the prior art which uses a stack of flat ribbons 54. This Figure clearly shows the wasted space 53 between the ribbon stack 54 and the inner wall 52 of the buffer tube/outer jacket 51. Further, when a large number of ribbons are in a tube, accessing any one, or any number, of fibers within the tube may be difficult, particularly those fibers located at the center of a ribbon stack. Finally, with fiber optic ribbons having a high fiber count (resulting in a wider ribbon) a significant amount of residual twist exists in the ribbon from the manufacturing process. This residual twist can make it difficult to splice fiber ribbons or maximize ribbon count in any one buffer tube or cable.

SUMMARY OF THE INVENTION

The present invention is directed to eliminating the above problems by the use of multi axis fiber optic ribbons having various shapes, but which are not flat ribbons as commonly known and understood in the fiber optic industry.

The present invention uses any commonly known or used fiber optic ribbon matrix materials, and any commonly known or used fiber optic ribbon manufacturing procedures to manufacture a multi axis fiber optic ribbon. The multi axis fiber optic ribbon of the present invention has a central portion, made up of a ribbon matrix material, and a number of wings or extensions extending from the central portion, wherein each wing may contain a plurality of individual fibers. In this ribbon construction at least two of the wings extend from the central portion in two different axis, or planes. For example, if one or two of the wings extend from the central portion along a horizontal plane through the central member, than at least one other wing extends from the central portion off of the horizontal plane through the center of the ribbon, thus resulting in a multi axis fiber optic ribbon.

In the present invention, it is preferred that the wings holding the individual fibers are made from the same matrix material as the central portion. Additionally, it is preferred that the wings and central portion be extruded and cured simultaneously so as to result in a continuous, integrated ribbon, much like the commonly known flat ribbons. However, the present invention can be manufactured with a central strength member (CSM) or any other type of dissimilar material in the central portion to add strength to the ribbon. For example, the CSM can be embedded in the matrix material making of the central portion.

Further, the present invention is not limited in the number of wings that can extend from the central portion, as long at least two wings extend from the central portion along two different axes. Further, the shape or configuration of the wings is not limited by the present invention.

BRIEF DESCRIPTION OF THE DRAWINGS

The advantages, nature and various additional features of the invention will appear more fully upon consideration of the illustrative embodiments of the invention which are schematically set forth in the drawings, in which.

DETAILED DESCRIPTION OF THE INVENTION

The present invention will be explained in further detail by making reference to the accompanying drawings, which do not limit the scope of the invention in any way.

Figure 1A:
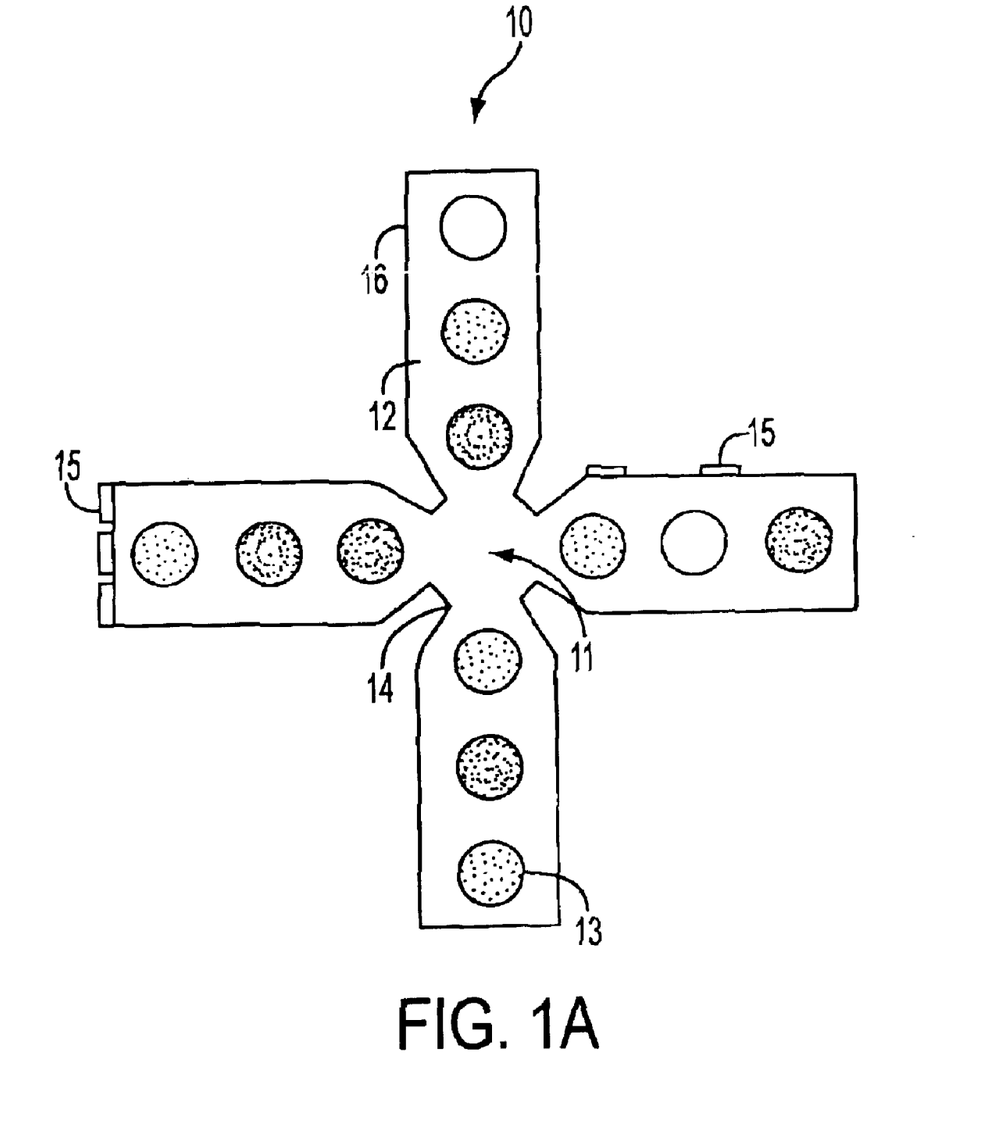
FIG. 1A is a diagrammatical representation of a multi axis ribbon according to the present invention, where the ribbon has a cross shape.
Figure 3A:
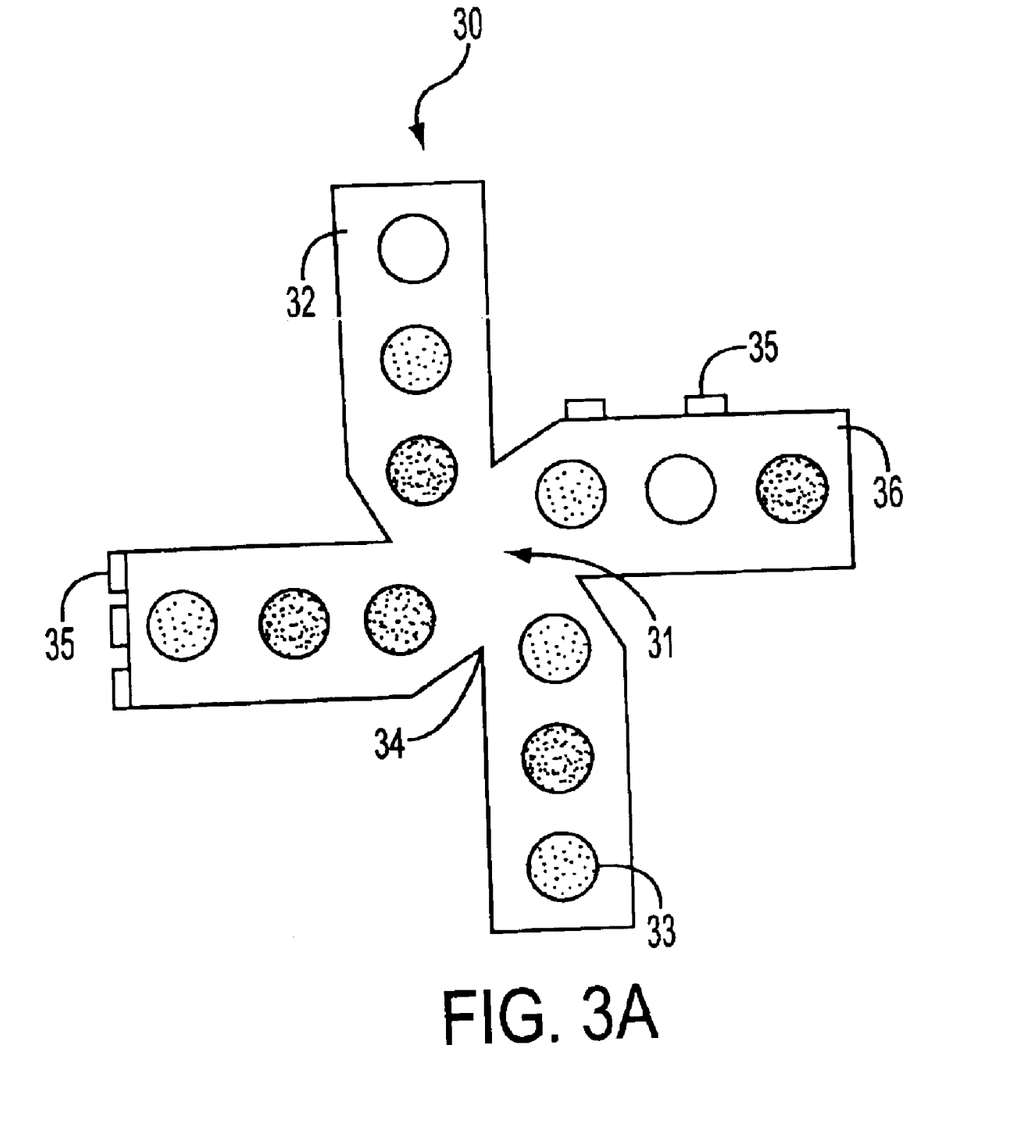
FIG. 3A is a diagrammatical representation of a multi axis ribbon according to the present invention, where the ribbon has a pinwheel shape.
Figure 5A:
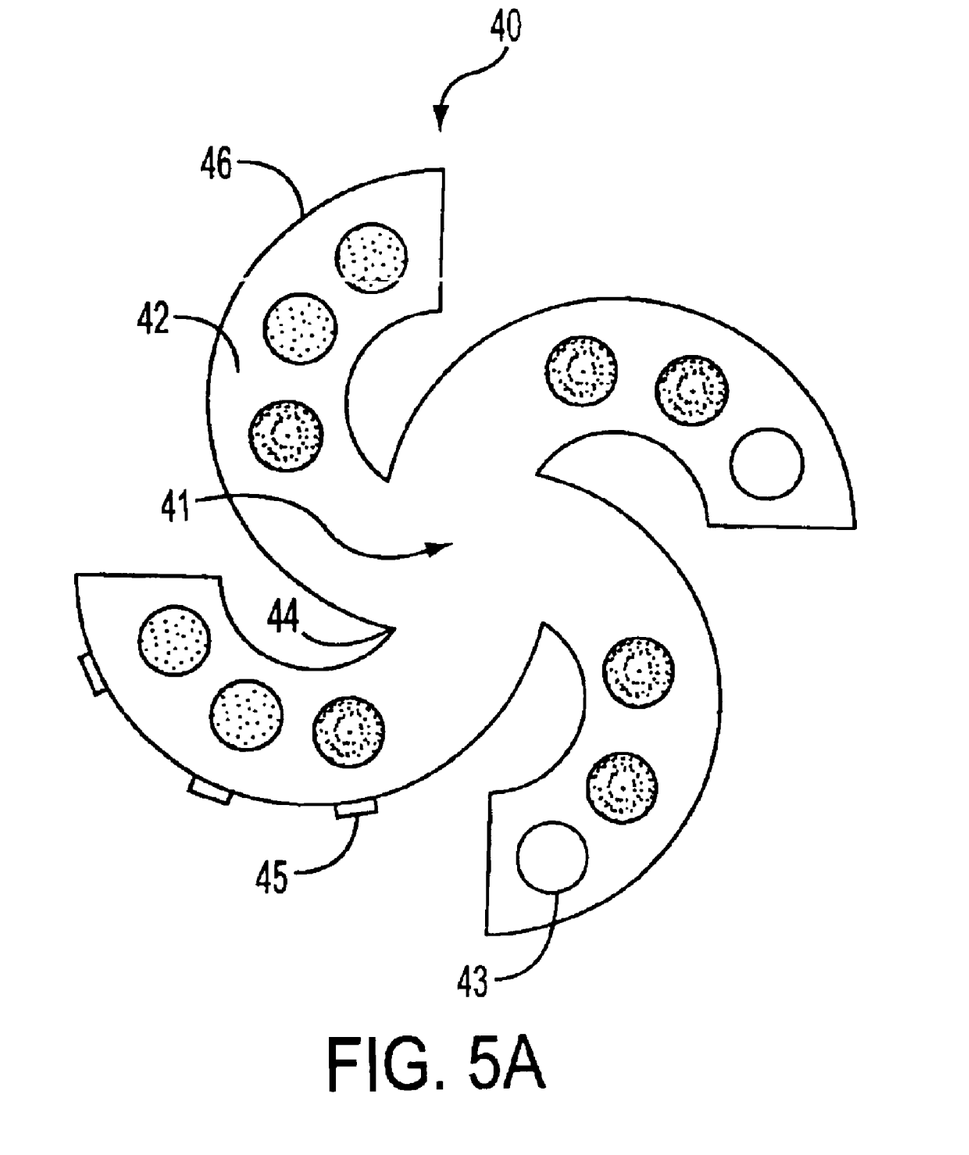
FIG. 5A is a diagrammatical representation of a multi axis ribbon according to the present invention, where the ribbon has a turbine shape.

Turning now to FIGS. 1A, 3A, and 5A, these Figures show various shape embodiments of the present invention. FIG. 1A shows a multi axis ribbon 10 having a cross shape, FIG. 3A shows a multi axis ribbon 30 having a pinwheel shape, and FIG. 5A shows a multi axis ribbon 40 having a turbine shape. Each of these Figures show the multi axis ribbon having a central portion 11, 31 and 41, respectively, from which a plurality (in this case four each) wings or extensions 12, 32, and 42, respectively, extend along more than one axis with respect to the central portions 11, 31, 41. In at least some of the wings or extensions (or as shown in all of the extensions) a plurality of individual fibers 13, 33, 43 are located. The spacing of the fibers within the extensions or wings can vary and is not critical to the present invention. It should be further noted that, although each of the embodiments shown show only four extensions or wings, the present invention is not limited to this and can have as few as two, or as many as reasonably practical given the various design, manufacture and space constraints, depending on the application of the fiber.

In the preferred embodiment of the present invention, the matrix material of the center portions 11, 31, 41 is the same as the matrix material 16, 36, 46 of the wings or extensions 12, 32, 42. This will allow uniformity in the structural integrity and make-up of the ribbon, and ease in manufacturing. Further, in the preferred embodiment, the wings or extensions (with the fibers) are co-extruded or drawn at the same time as the central portion, and are subsequently cured together. Although this is not necessary to the present invention, such a procedure will reduce the manufacturing steps and costs and provide a singular continuous ribbon matrix.

It should be noted that, although not shown in the present drawings, a strength member can be placed in the central portion to add additional strength or rigidity to the ribbon. In this embodiment the strength member would be embedded in the matrix material. Additionally a plurality of strength members can be used as required in the central portion, or a single central strength member can be used, depending on the requirements of the ribbon.

Further, as can be seen from the Figures, various shapes and cross-sections are contemplated for the present invention, and the present invention is not limited to the embodiments shown in the Figures. Any shape can be used depending on the design criteria for the specific application. Additionally, the length or thickness of the wings or extensions or the overall diameter of the central portion are also not limited by the present invention. The various dimensions of the ribbon cross-section can be optimized for the particular application for which it is to be used. Further, the central portion is not limited to a circular shape but can be of any practical shape. However, it should be noted that in the preferred embodiment, the width of the wings or extensions should be such that they provide adequate support and stability for the individual fibers, so as to prevent the fibers from inadvertently separating from the wings or extensions, and prevent the wings or extensions from inadvertently separating from the central portion.

Also, in the preferred embodiments of the invention, the wings or extensions 12, 32, 42 have recessed portions, tabs or notches 14, 34, 44 which are used to aid in separating the wings or extensions from the central portion. These notches or tabs provide a suitable separation zone between the central portion and the wing such that when the wing or extension is separated from the central portion, as shown in FIGS. 1B, 3B and 5B, the matrix material in the wing/extension or central portion is not damaged so as to compromise their integrity.

Finally, in the preferred embodiment, the wings or extensions would have some method of identification 15, 35, 45, so as to allow easy identification of each of the wings or extensions. Any commonly known or used method of identifying optical fibers or fiber ribbons may be used, such that the individual wings or extensions of the ribbon can be identified easily, during splicing, installation, etc. The extensions can be identified by using bar codes, alpha-numeric identification, color strip or banding information, or any other known or used method of identification. Further, the matrix material for the ribbon can be clear thus allowing the individual fibers to be identifiable through the matrix material.

Figure 1B:
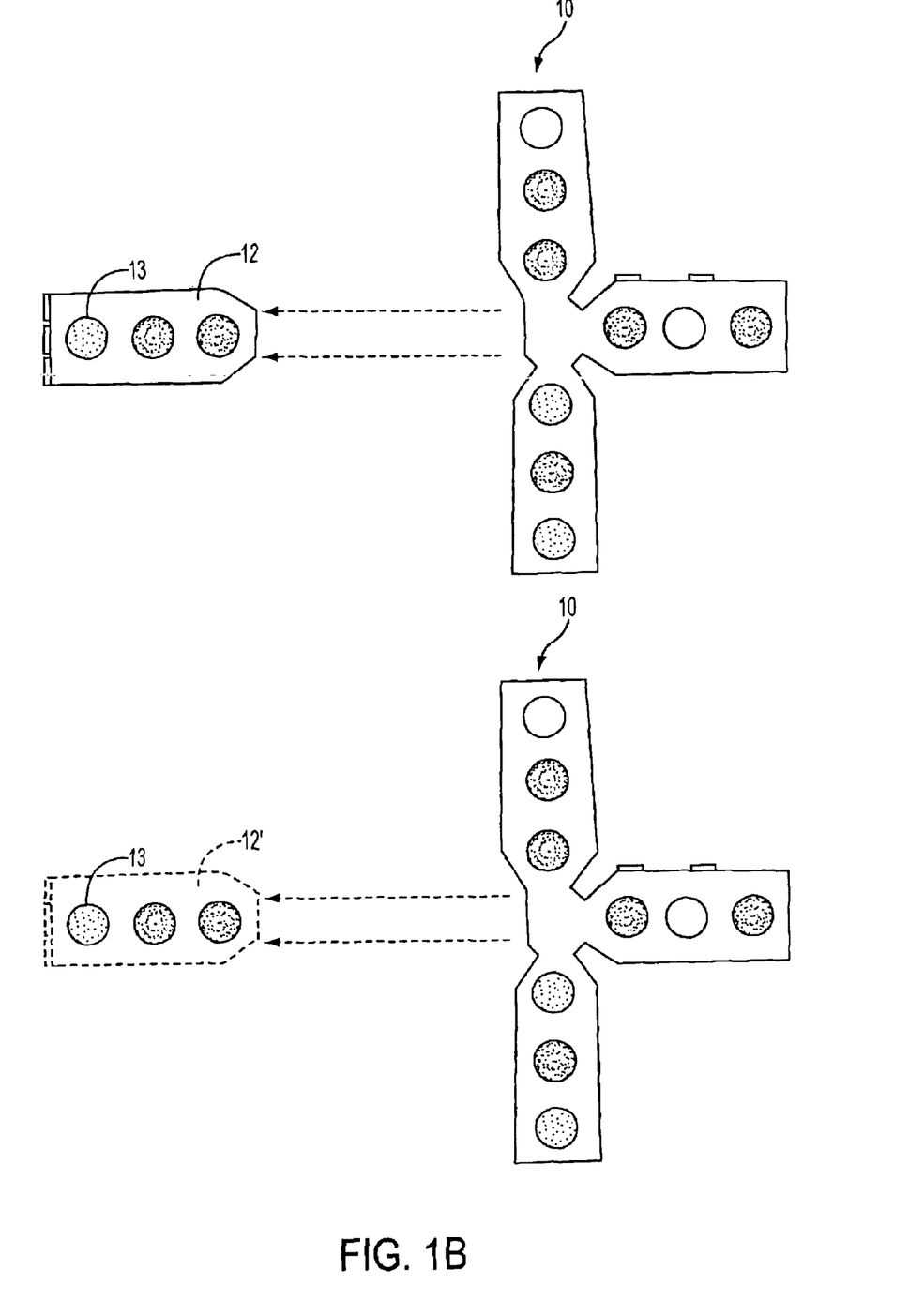
FIG. 1B is a diagrammatical representation of a multi axis ribbon according to the present invention, where the ribbon is in a cross shape, showing one of the wing sections removed from the central portion before and after the separated wing is prepared for mass fusion splicing.
Figure 3B:
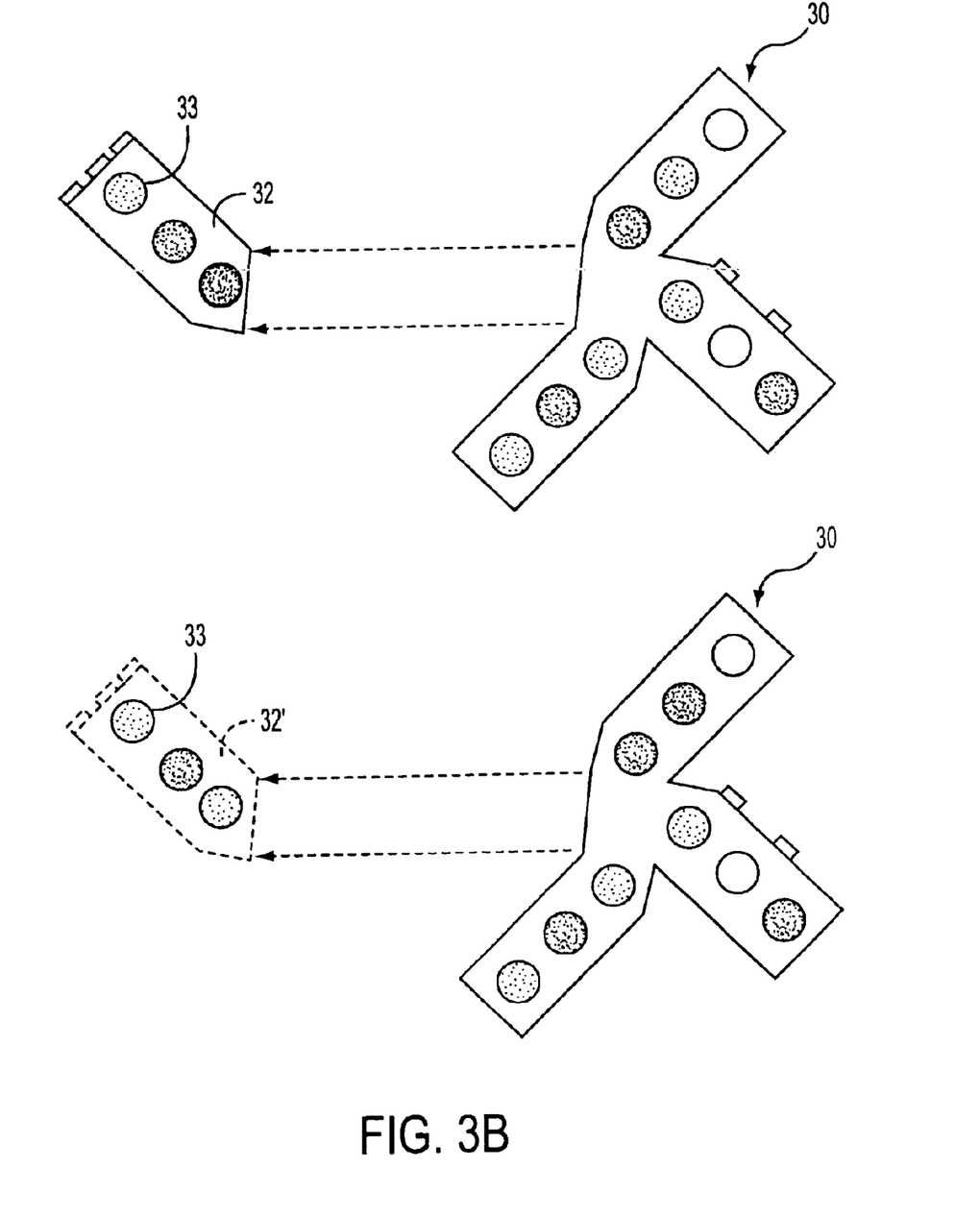
FIG. 3B is a diagrammatical representation of a multi axis ribbon according to the present invention, where the ribbon is in a pinwheel shape, showing one of the wing sections removed from the central portion before and after the separated wing is prepared for mass fusion splicing.
Figure 5B:
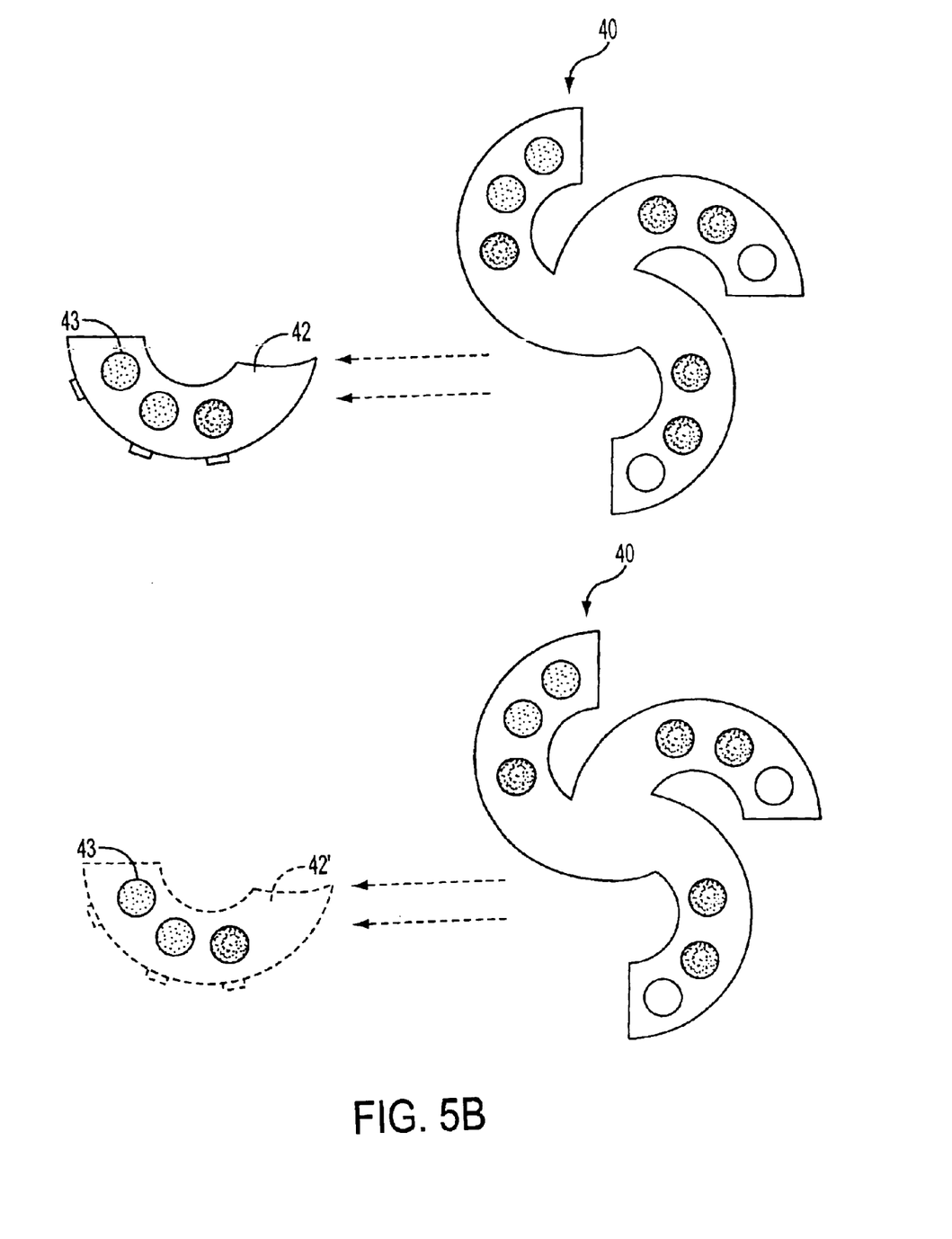
FIG. 5B is a diagrammatical representation of a multi axis ribbon according to the present invention, where the ribbon is in a turbine shape, showing one of the wing sections removed from the central portion before and after the separated wing is prepared for mass fusion splicing.

As shown in FIGS. 1B, 3B and 5B the wings or extensions can be separated from the central portion without compromising the integrity of the central portion or the separated wing. This will allow fibers to be broken off of the main ribbon for splicing, or routing to another location. These Figures depict a single extension being separated from the central portion before and after the separated extension is prepared for mass fusion splicing, where the matrix material is removed from the fibers in the separated extension.

Figure 2:
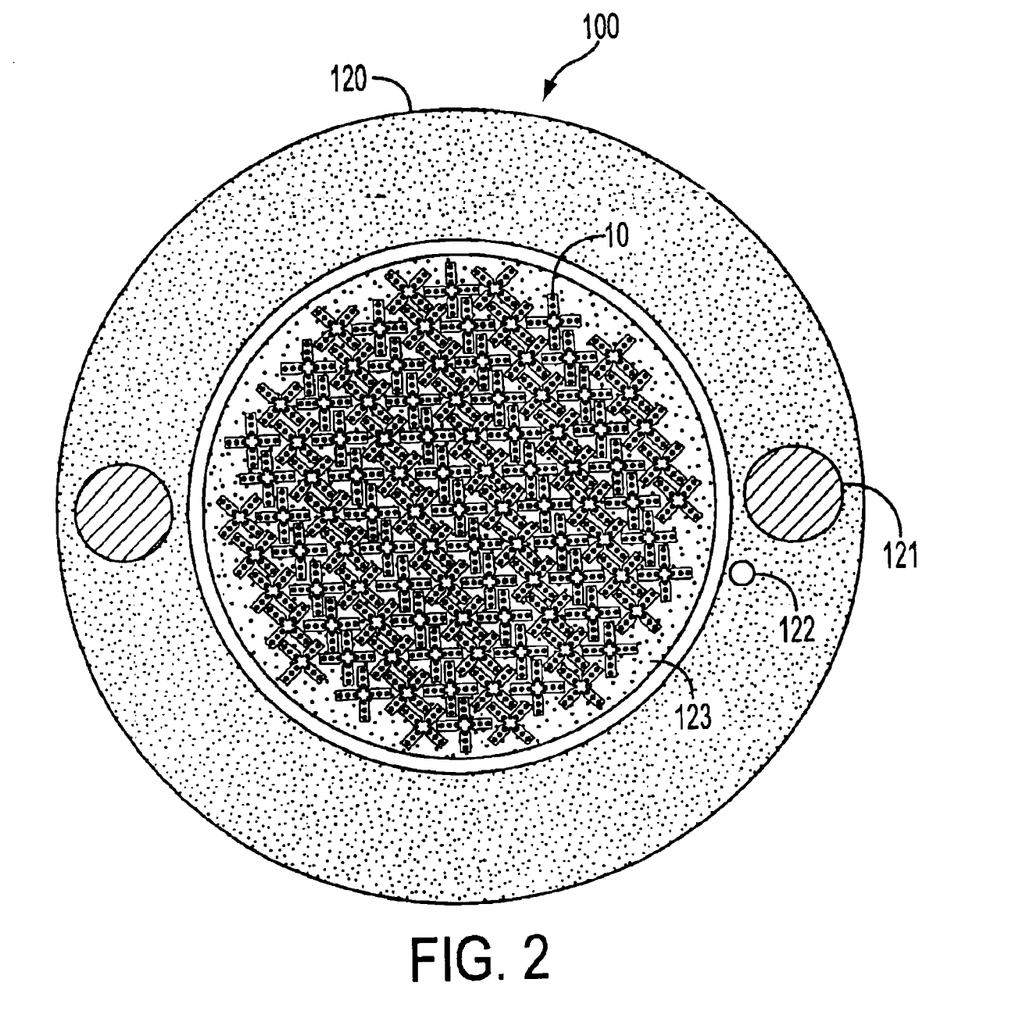
FIG. 2 is a diagrammatical representation of a fiber optic cable having a large number of cross-shaped multi axis fiber optic ribbons placed within the cable.
Figure 4:
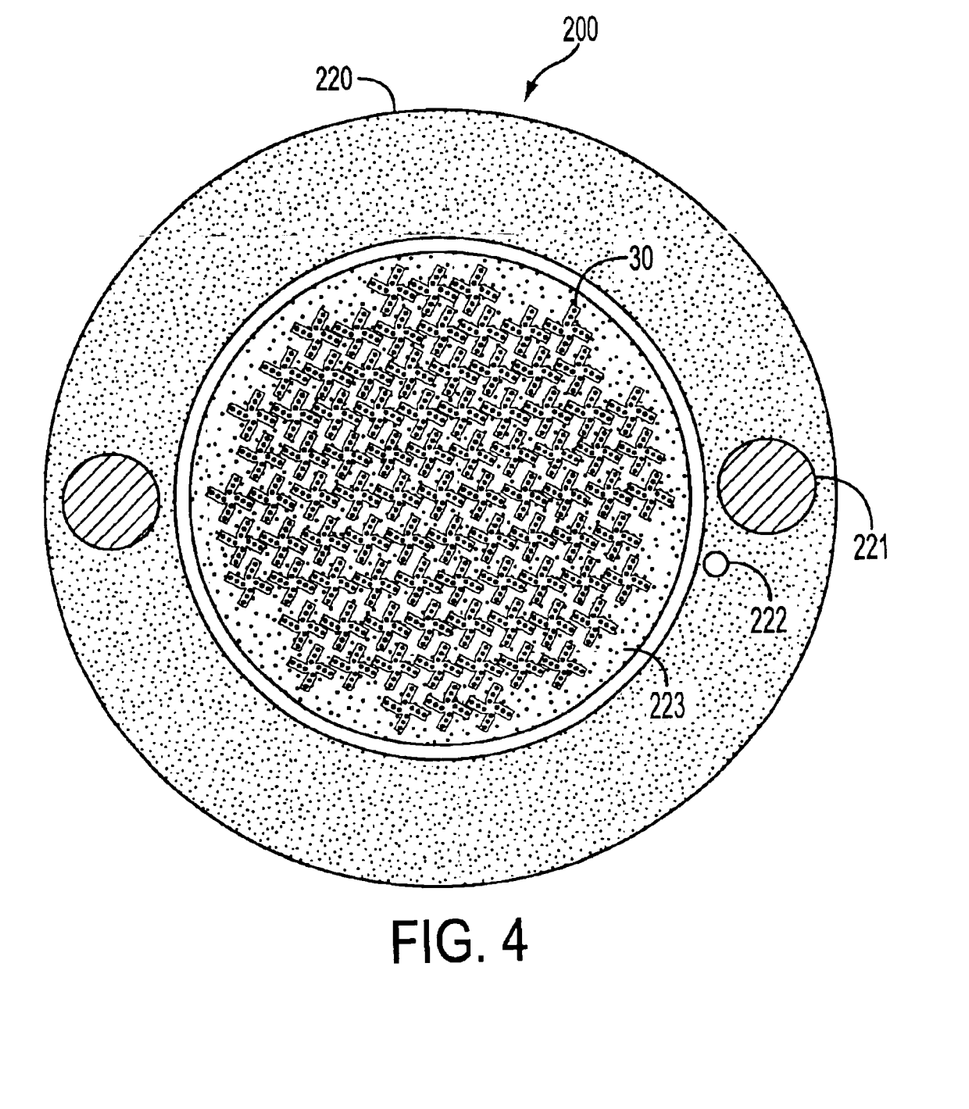
FIG. 4 is a diagrammatical representation of a fiber optic cable having a large number of pinwheel-shaped multi axis fiber optic ribbons placed within the cable.
Figure 6:
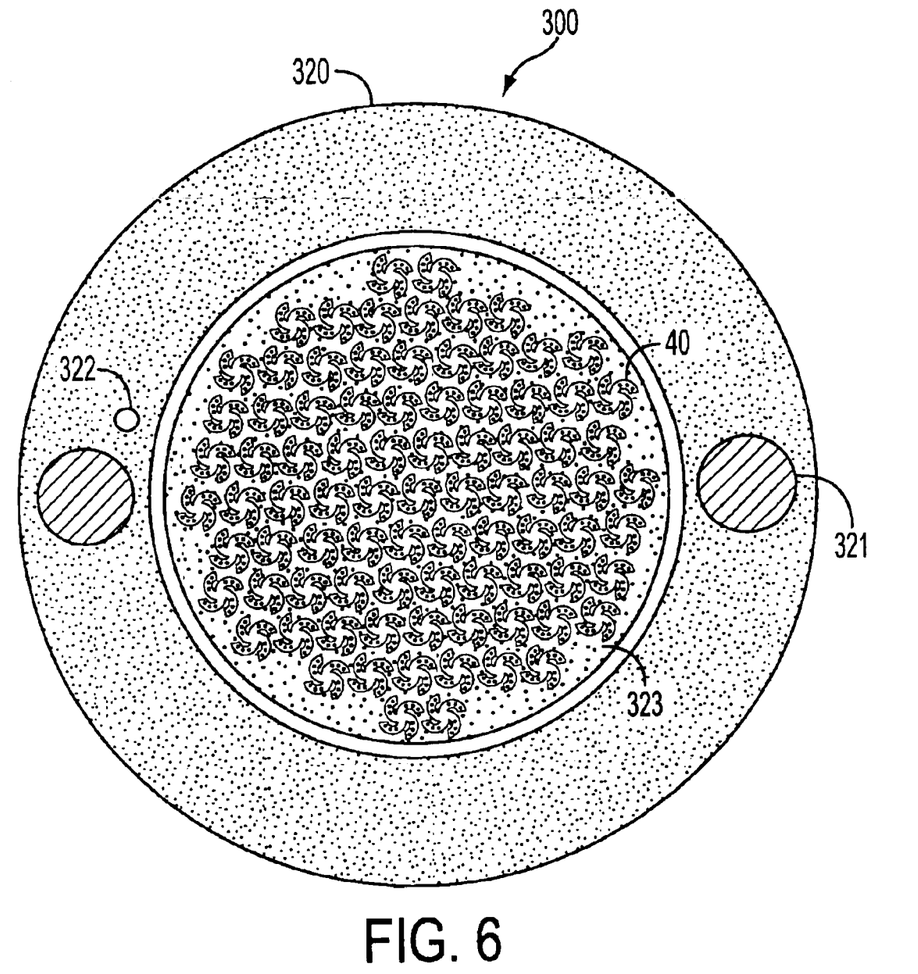
FIG. 6 is a diagrammatical representation of a fiber optic cable having a large number of turbine-shaped multi axis fiber optic ribbons placed within the cable.
Figure 7:
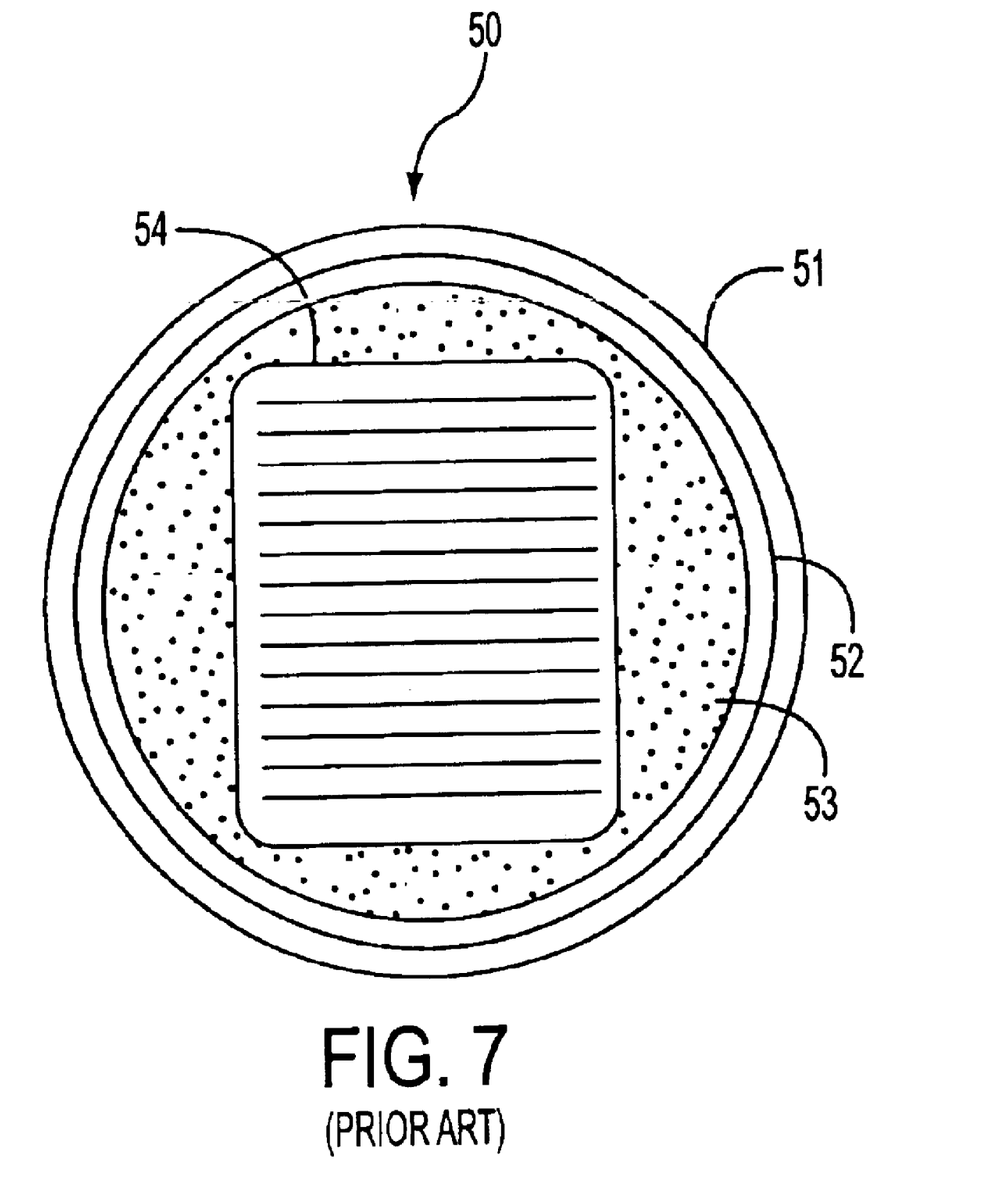
FIG. 7 is a diagrammatical representation of a fiber optic cable with a commonly known fiber optic ribbon stack.

Turning now to FIGS. 2, 4 and 6, these Figures show a fiber optic cable 100, 200, 300 having an outer jacket 120, 220, 320, strength members 121, 221, 321, a ripcord, 122, 222, 322, water blocking materials such as Super Absorbent Powder (SAP), water absorbent yarns and tapes, or water absorbent gel, 123, 223, 323, and a large number of multi axis ribbons 10, 30, 40. As can be seen in these Figures, the multi axis ribbons are intertwined or interweaved with each other so that the space within the cable is optimized, as compared to the prior art ribbon stacks, shown in FIG. 7. FIG. 7, shows a typical fiber optic cable assembly 50 as known in the prior art which uses a stack of flat ribbons 54. This Figure clearly shows the wasted space 53 between the ribbon stack 54 and the inner wall 52 of the buffer tube/outer jacket 51. The present invention allows this normally wasted space to be fully utilized, by allowing the wings or extensions of the ribbons to extend into the open space formed by any two extensions or wings in an adjacent ribbon. This is shown in FIGS. 2, 4 and 6 where the wings of the ribbons extend into a space created by the wings of adjacent ribbons, thus allowing the ribbons to be intertwined. This allows the cavity within the cable to be almost completely filled, thus optimizing the space within the cable and optimizing the fiber count for the cable. It should be noted that, although FIGS. 2, 4 and 6 show the cavity within the cable almost completely filled, the number of multi axis ribbons within the cable can vary depending on the application of the cable. Further, although the strength members 121, 221, 321 are shown in the outer jacket, it is contemplated that a single strength member can be placed in the center of the cable, having the multi axis ribbons surrounding the strength member, between the strength member and the outer jacket or buffer tube. It is further contemplated that the cable be comprised of a number buffer tubes, within the outer jacket, and a number of multi axis ribbons being placed within each buffer tube. Further, the cable may have a number of buffer tubes wherein some of the buffer tubes have multi axis ribbons of the present invention, while the others contain loose individual fibers or standard flat ribbons.

It is of course understood that departures can be made from the preferred embodiments of the invention by those of ordinary skill in the art without departing from the spirit and scope of the invention that is limited only by the following claims.

I claim:

1. A multi axis fiber optic ribbon, comprising:

a central portion; and a plurality of removable extensions bonded to and extending from said central portion, at least one of said extensions containing at least one optical fiber;

wherein at least one of said extensions extends from said central portion along an axis different from at least one other extension, and wherein said central portion is made from a fiber optic ribbon matrix material.

2. The multi axis fiber optic ribbon according to claim 1, wherein at least one of said plurality of extension is made from a fiber optic ribbon matrix material.

3. The multi axis fiber optic ribbon according to claim 2, wherein said central portion and said at least one of said plurality of extensions are made from the same fiber optic ribbon matrix material.

4. The multi axis fiber optic ribbon according to claim 1, wherein at least one of said extensions project along a substantially straight line from said central portion.

5. The multi axis fiber optic ribbon according to claim 1, further comprising means for separating said extensions from said central portion.

6. The multi axis fiber optic ribbon according to claim 1, wherein a thickness of each extension at a point where said extension contacts said central portion is less than a thickness at a point on said extension beyond said central portion.

7. The multi axis fiber optic ribbon according to claim 1, at least one of said extensions has means for identifying said extension.

8. The multi axis fiber optic ribbon according to claim 1, wherein at least one of said extensions has one of a bar code, alphanumeric, and color code identifier for identification of said extension.

9. The multi axis fiber optic ribbon according to claim 1, wherein each of said plurality of extensions has one of a bar code, alphanumeric, and color code identifier for identification of each of said extension, wherein each identifier for each extension is different from any other identifier.

10. The multi axis fiber optic ribbon according to claim 1, wherein at least one of said central portion and said extensions comprises at least one strength member.

11. The multi axis fiber optic ribbon according to claim 1, wherein said central portion and each of said extensions comprises at least one strength member.

12. A ribbon for optical fibers, comprising:

a central core;

a plurality of extensions situated radially around said central core, each extension having two ends, one end removably bonded to said central core, and the second end extending outward from said core;

wherein at least one of said extensions contains one or more optical fibers, and wherein said central core is made from a fiber optic ribbon matrix material.

13. The multi axis fiber optic ribbon according to claim 12, wherein at least one said plurality of extensions are made from a fiber optic ribbon matrix material, or an over-coated, dissimilar strength member.

14. The multi axis fiber optic ribbon according to claim 13, wherein said central core and said at least one of said plurality of extensions are made from the same fiber optic ribbon matrix material.

15. The multi axis fiber optic ribbon according to claim 12, wherein at least one of said extensions project along a substantially straight line from said central core.

16. The multi axis fiber optic ribbon according to claim 12, further comprising means for separating said extensions from said central core.

17. The multi axis fiber optic ribbon according to claim 12, wherein a thickness of each extension at a point where said extension contacts said central core is less than a thickness at a point on said extension beyond said central core.

18. The multi axis fiber optic ribbon according to claim 12, wherein at least one of said extensions has means for identifying said extension.

19. The multi axis fiber optic ribbon according to claim 12, wherein at least one of said extensions has one of a bar code, alphanumeric, and color code identifier for identification of said extension.

20. The multi axis fiber optic ribbon according to claim 12, wherein each of said plurality of extensions has one of a bar code, alphanumeric, and color code identifier for identification of each of said extension, wherein each identifier for each extension is different from any other identifier.

21. The multi axis fiber optic ribbon according to claim 12, wherein at least one of said central core and said extensions comprises at least one strength member.

22. The multi-axis fiber optic ribbon according to claim 12, wherein said central core and each of said extensions comprises at least one strength member.

23. A fiber optic cable; comprising:

an outer jacket; and a plurality of multi axis ribbons, said multi axis ribbons comprising:

a central core;

a plurality of extensions situated radially around said central core, each extension having two ends, one end removably bonded to said central core, and the second end extending outward from said core;

wherein at least one of said extensions contains one or more optical fibers, and wherein said central core is made from a fiber optic ribbon matrix material.

24. The fiber optic cable according to claim 23, wherein at least two of said plurality of multi axis ribbons are intertwined with each other such that a first one of said two ribbons extends into a space created by at least two of said extensions on a second of said two ribbons.

25. The multi axis fiber optic ribbon according to claim 1, wherein said at least one extension is formed integrally with said central portion.

26. The multi axis fiber optic ribbon according to claim 1, wherein said at least one extension and said central portion is formed as a single unit.

27. The multi axis fiber optic ribbon according to claim 13, wherein said at least one extension is formed integrally with said central core.

28. The multi axis fiber optic ribbon according to claim 13, wherein said at least one extension and said central core is formed as single unit.

29. The multi-axis fiber optic ribbon according to claim 1, wherein at least one of said extensions and said central member are co-extruded.

30. The multi-axis fiber optic ribbon according to claim 12, wherein at least one of said extensions and said central member are co-extruded.

31. A multi axis fiber optic ribbon, comprising:

a central portion; and a plurality of removable extensions extending from said central portion, at least one of said extensions containing at least one optical fiber;

wherein at least one of said extensions extends from said central portion along an axis different from at least one other extension, and wherein at least one of said extensions is formed integrally with said central portion.

32. A multi axis fiber optic ribbon, comprising:

a central portion; and a plurality of removable extensions extending from said central portion, at least one of said extensions containing at least one optical fiber;

wherein at least one of said extensions extends from said central portion along an axis different from at least one other extension, and wherein at least one of said extensions is co-extruded with said central portion.

* * * * *